US000001478H

United States Statutory Invention Registration [19]

[11] Reg. Number: H1478

Prieto

[43] Published: Sep. 5, 1995

[54] SECONDARY ALKYL SULFATE-CONTAINING LIQUID LAUNDRY DETERGENT COMPOSITIONS

[75] Inventor: Nelson E. Prieto, Richmond, Tex.

[73] Assignee: Shell Oil Company, Houston, Tex.

[21] Appl. No.: 129,891

[22] Filed: Sep. 30, 1993

[51] Int. Cl.[6] ..... C11D 9/00

[52] U.S. Cl. ..... 252/531; 252/174.19; 252/174.21; 252/550

[58] Field of Search ..... 252/174.21, 174.19, 252/531, 550

[56] References Cited

U.S. PATENT DOCUMENTS

| | | | |
|---|---|---|---|
| 3,720,621 | 3/1973 | Smeets | 252/135 |
| 4,235,752 | 11/1980 | Rossall et al. | 252/551 |
| 4,490,271 | 12/1984 | Spadini et al. | 252/174.23 |
| 4,507,219 | 3/1985 | Hughes | 252/118 |
| 4,666,740 | 5/1987 | Wixon | 427/214 |
| 4,668,423 | 5/1987 | Drozd et al. | 252/174.21 |
| 4,692,275 | 9/1987 | Secemski et al. | 252/534 |
| 4,857,213 | 8/1989 | Caswell et al. | 252/8.75 |
| 4,880,569 | 11/1989 | Leng et al. | 252/550 |
| 4,923,636 | 5/1990 | Blackburn et al. | 252/550 |
| 4,983,317 | 1/1991 | Requejo et al. | 252/174.24 |
| 5,009,804 | 4/1991 | Clayton et al. | 252/90 |
| 5,035,838 | 7/1991 | Merrill et al. | 252/545 |
| 5,057,238 | 10/1991 | Broze et al. | 252/99 |
| 5,073,293 | 12/1991 | Deguchi et al. | 252/174.17 |
| 5,075,041 | 12/1991 | Lutz | 252/548 |
| 5,091,101 | 2/1992 | Hildreth | 252/89.1 |
| 5,102,573 | 4/1992 | Han et al. | 252/153 |

FOREIGN PATENT DOCUMENTS

| | | |
|---|---|---|
| 0342177 | 11/1989 | European Pat. Off. . |
| 884656 | 1/1958 | United Kingdom . |
| 1560073 | 1/1980 | United Kingdom . |

*Primary Examiner*—Donald P. Walsh
*Assistant Examiner*—Chrisman D. Carroll

[57] ABSTRACT

The present invention relates to a laundry liquid detergent composition comprising from about 1 percent by weight to about 18 percent by weight, basis the total weight of the composition, of one or more secondary alkyl sulfate compounds, from about 6 percent by weight to about 18 percent by weight, basis the total weight of the composition, of one or more additional or cosurfactant compounds, from about 0 percent by weight to about 20 percent by weight, basis the total weight of the composition, of one or more builders, and from about 35 percent by weight to about 78 percent by weight, basis the total weight of the composition, of one or more solvents.

17 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SECONDARY ALKYL SULFATE-CONTAINING LIQUID LAUNDRY DETERGENT COMPOSITIONS

FIELD OF THE INVENTION

The present invention relates to liquid laundry detergent compositions containing one or more secondary alkyl sulfate compounds as anionic surfactant components.

BACKGROUND OF THE INVENTION

Linear alkylbenzene sulfonate (LAS) is one of the most widely used surfactants in commerce. It finds special application for light and heavy duty liquid and powdered detergents. A potential disadvantage of LAS, however, is that under hard water conditions, i.e., calcium levels greater than about 150 parts per million, it can interact with cationic water hardness ions, such as calcium, thereby becoming inactivated through precipitation. While this is a problem common to anionic surfactants, LAS is especially sensitive to water hardness ions.

Although not wishing to be bound by any theory, the literature indicates that the aforementioned interaction can best be understood by considering the micellar structure of anionic surfactants, e.g., LAS. Repulsive forces between negative charges in the sulfonate group lead to a higher critical micelle concentration (CMC) than, for example, with a nonionic surfactant. CMC is the surfactant concentration at which micellar formation begins. Stated otherwise, the negative charge of LAS retards micellar formation and shifts the equilibrium towards the monomer. A relatively high monomer concentration in solution results thereby; this is significant because precipitation between calcium ion and LAS occurs only with the monomer.

It has been found that liquid laundry detergent compositions containing secondary alkyl sulfate as an anionic surfactant component can be used in liquid laundry detergent compositions in place of either LAS or primary alkyl sulfates with the advantages being increased tolerance for water hardness ions, good detergency properties, higher active raw material, i.e., less water, and better color of anionic raw material.

SUMMARY OF THE INVENTION

The present invention provides a liquid laundry detergent composition which comprises from about 1 percent by weight to about 18 percent by weight, basis the total weight of the composition, of one or more secondary alkyl sulfate compounds, from about 6 percent by weight to about 38 percent by weight, basis the total weight of the composition, of one or more additional surfactant or cosurfactant compounds, from about 0 percent by weight to about 20 percent by weight, basis the total weight of the composition, of one or more builders, and from about 35 percent by weight to about 78 percent by weight, basis the total weight of the composition, of one or more solvents.

DESCRIPTION OF THE PREFERRED EMBODIMENTS

Figure 1:
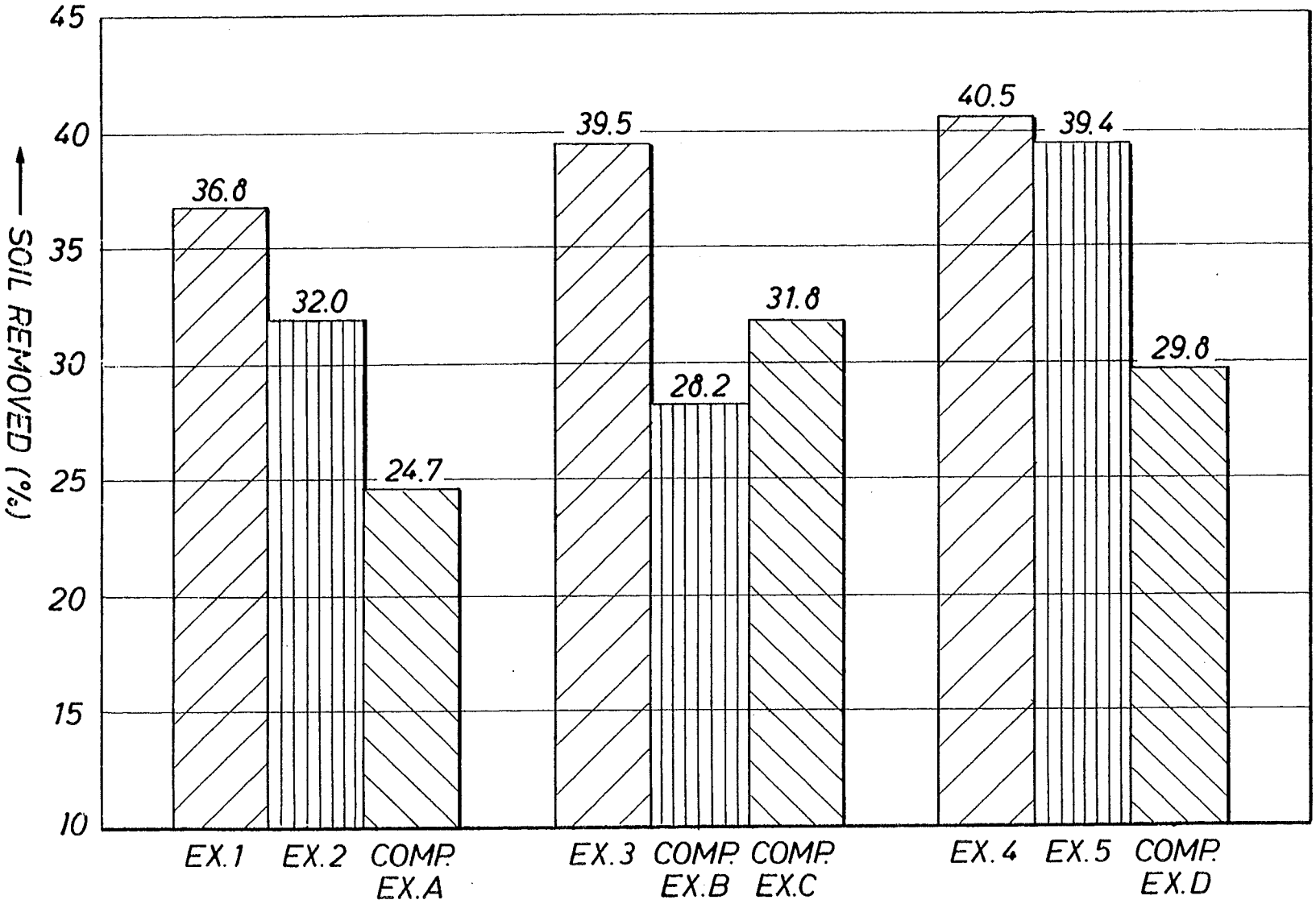
FIG. 1 represents the level of multisebum soil which can be removed by both secondary alkyl sulfate-containing liquid laundry compositions and non-secondary alkyl sulfate-containing liquid laundry compositions from a polyester/cotton fabric at a temperature of 60° F. and a water hardness level of 300 parts per million.

The present invention provides a liquid laundry detergent composition or formulation which comprises from about 1 percent by weight to about 18 percent by weight, preferably from about 6 percent by weight to about 15 percent by weight, basis the total weight of the composition, of one or more secondary alkyl sulfate compounds, from about 6 percent by weight to about 38 percent by weight, preferably from about 6 percent by weight to about 18 percent by weight, basis the total weight of the composition, of one or more additional surfactant or cosurfactant compounds, from about 0 percent by weight to about 20 percent by weight, preferably from about 4 percent by weight to about 12 percent by weight, basis the total weight of the composition, of one or more builders, and from about 35 percent by weight to about 78 percent by weight, preferably from about 40 percent by weight to about 60 percent by weight, basis the total weight of the composition, of one or more solvents.

The secondary alkyl sulfate compounds serve as multifunctional components in the composition. Functioning as anionic surfactant, the presence of these compounds aids in the removal of particulate and oily soils. The secondary alkyl sulfate component further aids in providing a detergent composition which is tolerant to hard water wash applications. In addition, the secondary alkyl sulfate component aids in facilitating the suspension of soil in the washwater and its effective separation from laundered fabrics. These several functions of the secondary alkyl sulfate compounds provide a very effective composition in terms of both its detergent performance and physical properties.

The secondary alkyl sulfate compounds suitable for use in the liquid laundry detergent composition of the present invention have the formula:

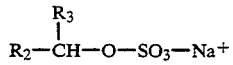

$$R_2-\underset{}{\overset{R_3}{\overset{|}{CH}}}-O-SO_3-Na^+$$

wherein $R_2$ represents an alkyl group having from about 3 to about 18 carbon atoms, and $R_3$ represents an alkyl group having from about 1 to about 6 carbon atoms. In a preferred embodiment, $R_2$is an alkyl group having from about 10 to about 16 carbon atoms, and $R_3$ is an alkyl group having from about 1 to about 2 carbon atoms. It is preferred that $R_2$ and $R_3$ together are alkyl groups having a total of from about 11 to about 17 carbon atoms. Preferred secondary alkyl sulfate compounds include $C_{12}$ secondary alkyl sulfates (particularly those in which $R_2$ in the above formula represents an alkyl group having 10 carbon atoms and $R_3$ in the above formula represents an alkyl group having 1 carbon atom), $C_{14}$ secondary alkyl sulfates (particularly those in which $R_2$ in the above formula represents an alkyl group having 12 carbon atoms and $R_3$ in the above formula represents an alkyl group having 1 carbon atom) $C_{16}$ secondary alkyl sulfates (particularly those in which $R_2$ in the above formula represents an alkyl group having 14 carbon atoms and $R_3$ in the above formula represents an alkyl group having 1 carbon atom), $C_{18}$ secondary alkyl sulfates (particularly those in which $R_2$ in the above formula represents an alkyl group having 16 carbon atoms and $R_3$ in the above formula represents an alkyl group having 1 carbon atom), and blends of these compounds. The secondary alkyl sulfate component of the heavy duty liquid compositions of the present invention typically comprises a $C_{14}$ secondary alkyl sulfate compound, although blends of one or more $C_{14}$ secondary alkyl sulfate compounds and one or more $C_{18}$ secondary alkyl sulfate compounds, and blends of one or more $C_{14}$ secondary alkyl sulfate compounds, one or more $C_{16}$ secondary alkyl sulfate compounds, and one or more $C_{18}$ secondary alkyl sulfate compounds also provide suitable liquid laundry compositions.

For enhanced biodegradability, it is preferred that the alkyl groups $R_2$ and $R_3$ of the secondary alkyl sulfate molecule all be of predominantly linear carbon chain structure. In this respect, it is particularly preferred that the surfactant molecules be essentially free of alkyl groups having multiple branches in the carbon chain.

The secondary alkyl sulfate compound(s) suitable for use in the present invention is a solid, free-flowing powdered material which has a water content of less than about 3 percent by weight and which is substantially free of diluents. These solid surface active compositions are generally prepared by a crystallization technique. Specifically, the solid secondary alkyl sulfate compositions are prepared by contacting a detergent range alkyl sulfuric acid-containing solution with a base in aqueous solution, removing substantially all of the water from the mixture, cooling in the presence of a nonionic organic liquid diluent to crystallize a solid secondary alkyl sulfate-containing surface active composition from the mixture, and recovering and drying the crystallized secondary alkyl sulfate product. The solid secondary alkyl sulfate product contains at least about 80 percent by weight to about 99 percent by weight of secondary alkyl sulfate. The product generally contains some residual level of sodium sulfate. The product typically contains less than about 12 percent by weight, preferably less than about 9 percent by weight, of sodium sulfate.

The liquid detergent composition of the invention comprises from about 1 to about 18 percent by weight of the secondary alkyl sulfate component. Compositions containing from about 6 to about 15 percent by weight of the secondary alkyl sulfate component are preferred, while compositions containing from about 9 percent by weight and about 13 percent by weight of the secondary alkyl sulfate component are particularly preferred.

The liquid laundry detergent also contains at least one or more additional surfactant or cosurfactant compounds. The additional or cosurfactant compound is selected from the group consisting of nonionic surfactants, anionic surfactants, cationic surfactants, zwitterionic surfactants and mixtures thereof. The additional or cosurfactant compounds function as cleaning agents in the detergent composition of the present invention. In a preferred embodiment, it is preferred that the additional surfactant be one or more nonionic surfactants.

The nonionic surfactant or surfactants generally useful as additional or cosurfactant compounds in the present invention are the ethylene oxide condensates (i.e., compounds produced by the condensation of ethylene oxide groups which are hydrophilic in nature with an organic hydrophobic compound which can be aliphatic or alkyl aromatic in nature) and the sugar-derived glycols (i.e., alkylpolyglycosides).

Particularly suitable nonionic surfactants are typically made up of one or more ethylene oxide adducts, i.e. ethoxylates of alcohols or alkyl-substituted phenols, and can be represented by the formula $R—O—(CH_2CH_2O)_n—H$, wherein the RO group corresponds to the starting alcohol or alkyl-substituted phenol (less its active hydrogen atom). In general, the suitable alcohol ethoxylates are derived from alcohols in the carbon range of from about 8 to about 18, while the suitable alkyl phenol ethoxylates are derived from alkyl phenols having alkyl substituents in the carbon range of from about 8 to about 2. Both the alcohol ethoxylates and the alkyl phenol ethoxylates are nonionic surfactants well known as components of conventional laundry detergent products.

With regard to the use of alcohol ethoxylate surfactants, the individual compounds are preferably characterized by an alkyl R group in the carbon number range of from about 11 to about 15. Both primary and secondary alcohol ethoxylates (having primary or secondary alkyl R groups, respectively) are suitable in the invention. The R group is suitably linear or branched.

The alkyl-substituted phenol ethoxylate compounds preferably have an alkyl substituent with between about 8 and about 11 carbon atoms. The alkyl substituent may either be branched or linear.

Suitable nonionic ethoxylate surfactants typically contain an average number of ethylene oxide units (i.e., an average value of n in the above formula) which is in the range of from about 3 to about 14 per molecule. Preferably, the ethoxylate surfactants contain an average number of ethylene oxide units which is in the range of from about 5 to about 9 per molecule.

The sugar-derived glycols or alkyl glycosides which are useful as nonionic surfactants preferably have from about 6 to about 30 carbon atoms. Particularly suitable sugar-derived glycols are the alkylpolyglycosides.

Suitable anionic surfactants for use as additional surfactant or cosurfactant compounds in the liquid laundry detergent compositions of the present invention include the water-soluble, particularly the alkali metal, ammonium and alkylammonium (e.g., monoethanolammonium, diethanolammonium or triethanolammonium) salts of organic sulfuric acid reaction products having in their molecular structure an alkyl group containing from about 10 to about 20 carbon atoms and a sulfonic or sulfuric acid ester group. As used herein, the term "alkyl" also includes the alkyl portion of aryl groups. Examples of anionic synthetic surfactants include primary alkyl sulfates, especially those obtained by sulfating the higher alcohols ($C_8$ to $C_{18}$ s carbon atoms), and alkylbenzene sulfonates in which the alkyl group contains from about 9 to about 15 carbon atoms in a straight chain or branched chain configuration.

Other suitable anionic surfactants which can be used in addition to secondary alkyl sulfate in the liquid detergent composition include the water-soluble salts of: paraffin sulfonates containing from about 8 to about 24 carbon atoms; olefin sulfonates containing from about 8 to about 24, preferably from about 12 to about 16 carbon atoms, particularly alpha olefin sulfonates; alkenyl or alkyl carboxysulfonates containing from about 8 to about 30 carbon atoms; alkyl ethoxycarboxylates containing from about 8 to about 24 carbon atoms and having from about 1 to about 10 units of ethylene oxide per molecule; alkyl glyceryl ether sulfonates derived from ethers of $C_8$–$C_{18}$ alcohols; alkyl phenol ethoxysulfates containing from about 1 to about 10 units of ethylene oxide per molecule and from about 8 to about 12 carbon atoms in the alkyl group; ethoxysulfates, i.e., alkyl ethylene oxide ether sulfates, containing from about 1 to about 10 units of ethylene oxide per molecule and from about 10 to about 15 carbon atoms in the alkyl group; and soap. Especially suitable are water-soluble salts of alcohol ethoxysulfates containing from about 1 to about 6 units of ethylene oxide per molecule and from about 8 to about 18 carbon atoms in the alkyl group.

Other useful anionic surfactants include the water-soluble salts of esters of alpha-sulfonated fatty acids containing from about 6 to about 20 carbon atoms in the fatty acid group and from about 1 to about 10 carbon atoms in the ester group; water-soluble salts of 2-acyloxy-alkane-1-sulfonic acids containing from about 2 to about 9 carbon atoms in the acyl group and from about 9 to about 23 carbon atoms in the alkane moiety; and beta-alkoxy alkane sulfonates containing from about 1 to about 3 carbon atoms in the alkyl group and from about 8 to about 20 carbon atoms in the alkane moiety.

Preferred anionic surfactants for use as additional or cosurfactant compounds are the alcohol ethoxysulfates which contain an average of up to about 6 ethylene oxide units per mole of alkyl sulfate.

Suitable zwitterionic surfactants for use as additional surfactant or cosurfactant compounds in the present composition include derivatives of aliphatic quaternary ammonium, phosphonium, and sulfonium compounds in which the aliphatic moiety can be straight chain or branched chain and wherein one of the aliphatic substituents contains at least one anionic water-solubilizing group. Examples of suitable zwitterionic surfactants include 3-(N,N-dimethyl-N-hexadecylammonio) -propane-1- sulfonate and the ammonium sulfonates and sulfates disclosed in U.S. Pat. Nos. 3,925,262, issued Dec. 9, 1975 and 3,929,678, issued Dec. 30, 1975, the teachings of which are incorporated herein by reference.

Suitable cationic surfactants for use as additional or cosurfactant compounds in the present liquid detergent composition include octadecyl trimethylammonium chloride, cetyl trimethylammonium methyl sulfate, polymeric cationics derived from monomers such as N,N, N-trimethyl-N-methylacryloxy (2-hydroxypropyl) ammonium chloride and cationic monomers such as those described in U.S. Pat. Nos. 4,212,820, issued on Jul. 15, 1980, 4,098,987, issued on Jul. 4, 1978, 4,171,418, issued on Oct. 16, 1979, and 4,426,489, issued Jan. 7, 1984, the relevant teachings of which are incorporated herein by reference. In addition to quaternary ammonium cationic moieties, the compounds with phosphonium, sulfonium, pyridium and isothiouronium moieties and the like are also among the well known cationic surfactants.

The additional surfactant or cosurfactant compound(s) is typically utilized in the liquid laundry detergent composition in an amount of from about 6 percent by weight to about 38 percent by weight, and preferably in the range of from about 6 percent by weight to about 18 percent by weight, basis the total weight of the liquid laundry detergent composition.

The liquid laundry detergent composition of the present invention can, if desired, contain a detergent builder component. Builders are known to be added to liquid detergent compositions to enhance cleaning performance by softening water and providing alkalinity and buffering capacity to the wash. This builder component can either be of the organic or inorganic type. The builder component is preferably one or more materials selected from the group consisting of hydratable alkali metal phosphates, alkali metal carbonates and bicarbonates (mixed or separate, anhydrous or partially hydrated), zeolites (either crystalline or amorphous, and either natural or synthetic), ethylenediamine tetraacetate, nitrilotriacetate, and mixtures thereof. Carbonate and phosphate builders are particularly preferred. Examples of water-soluble inorganic builders which can be used, alone or in admixture with themselves and organic alkaline builder salts, are alkali metal carbonates, phosphates, polyphosphates, and silicates. Specific examples of such salts are sodium tripolyphosphate, sodium carbonate, potassium carbonate, trisodium phosphate, tetrasodium pyrophosphate, tetrapotassium pyrophosphate, potassium tripolyphosphate, and sodium hexametaphosphate. Examples of organic builder salts which can be used alone, or in admixture with each other or with the preceding inorganic alkaline builder salts are alkali metal polycarboxylates, e.g., water-soluble citrates such as sodium and potassium citrate, sodium and potassium tartrate, the sodium and potassium salts of tartaric acid monosuccinate, the sodium and potassium salts of tartaric acid disuccinate, sodium and potassium ethylenediaminetetraacetate, sodium and potassium N(2-hydroxyethyl)-ethylene diamine triacetates, sodium and potassium nitrilo triacetates and sodium and potassium N-(2-hydroxyethyl)-nitrilo diacetates. Other organic detergency builders such as water-soluble phosphonates can find use in the compositions of the invention. When the liquid laundry detergent contains a builder component, the builder is generally present in an amount between about 0 percent by weight and about 20 percent by weight, preferably in an amount between about 4 percent by weight and about 12 percent by weight, and most preferably between about 6 percent by weight and about 12 percent by weight, basis the total weight of the liquid laundry detergent composition.

The liquid laundry detergent composition may also contain an alkanolamine component selected from the group consisting of an monoethanolamine, diethanolamine, triethanolamine and mixtures thereof. Low levels of the alkanolamines, particularly monoethanolamine, are preferred to enhance product stability, detergency performance, and odor. While the present compositions can contain mixtures of the alkanolamines, best color stability is obtained using single alkanolamines. When the liquid laundry detergent contains an alkanolamine component, such component is typically present in the composition in an amount in the range of from about 0 percent by weight to about 7 percent by weight, and preferably in an amount in the range of from about 1 percent by weight to about 4 percent by weight, basis the total weight of the liquid laundry detergent composition.

The only other necessary component of the laundry liquid composition of the present invention is one or more solvents to aid in the blending of the surfactants and builder components, if present. The solvent may be water or any other known solvent which aids in the blending of surfactants. Solvents other than water which are suitable include the lower alcohols such as, for example, ethanol, isopropanol, butanol, etc., the alkali metal aryl sulfonates such as, for example, sodium xylenesulfonate, sodium cumenesulfonate, sodium toluenesulfonate, etc., the polyols such as, for example, propylene glycol, hexylene glycol, etc., and the like and mixtures thereof. The solvent(s) is typically present in the laundry liquid composition in an amount in the range of from about 35 percent by weight to about 78 percent by weight, basis the total weight of the composition.

When a lower alcohol is used as a solvent, it is typically used in combination with at least one other solvent such as water, polyols, etc. The amount of lower alcohol utilized in the laundry liquid composition is generally an amount in the range of from about 0.1 percent by weight to about 7 percent by weight, basis the total weight of the composition.

Any polyol containing from about 2 to about 6 carbon atoms and from 2 to about 6 hydroxy groups can be used as a solvent in the laundry liquid compositions of the present invention. Examples of such polyols are ethylene glycol, propylene glycol, hexylene glycol and glycerine. Propylene glycol is particularly preferred. When a polyol is used as a solvent, the polyol typically is used in combination with at least one other solvent and represents from about 0.1 percent by weight to about 8 percent by weight, basis the total weight of the detergent composition.

In a preferred embodiment, the solvent is water or a water-containing solvent system. The laundry liquids generally contain from about 25 percent by weight to about 73 percent by weight, preferably from about 40 percent by weight to about 60 percent by weight, basis the total weight of the composition, of water. A particularly suitable water-containing solvent system contains water, ethanol and one or more polyols.

In addition to its principal components, secondary alkyl sulfate, additional surfactant, and solvent, the liquid laundry detergent composition may suitably contain minor amounts of other components known in the art for use in laundry liquids. Non-limiting examples of such component include dyes, fragrances, bleaches, bleach activators, enzymes, viscosity modifiers, and the like. The amount of these components present in the liquid detergent composition will typically be less than about 7 percent by weight, and preferably less than about 3 percent by weight, basis the total weight of the composition.

The principal components of the liquid detergent composition are suitably blended into the finished composition by conventional methods for the preparation of liquid detergent compositions, for instance, by direct mixing/blending. In a preferred embodiment, the liquid laundry detergent composition contains from about 6 percent by weight to about 15 percent by weight, basis the total weight of the composition, of a secondary alkyl sulfate compound having a carbon number in the range of from about 12 to about 18, from about 6 percent by weight to about 18 percent by weight, basis the total weight of the composition, of at least one additional surfactant, from about 4 percent by weight to about 12 percent by weight, basis the total weight of the composition, of a builder, and from about 40 percent by weight to about 60 percent by weight, basis the total weight of the composition, of a solvent.

The ranges and limitations provided in the instant specification and claims are those which are believed to particularly point out and distinctly claim the present invention. It is, however, understood that other ranges and limitations which perform substantially the same function in substantially the same manner to obtain the same or substantially the same result are intended to be within the scope of the present invention as defined by the specification and claims.

The invention is further described with reference to the following examples, which are intended to illustrate certain aspects of the invention, without limiting its broader scope.

ILLUSTRATIVE EMBODIMENTS

Example 1

49 Grams of water were added to the mixing vessel and warmed to 90° F. (38° C.). 2 Grams of ethanol, 2 grams of monoethanolamine and 4 grams of propylene glycol were then added. 12.1 Grams of $C_{14}$ secondary alkyl sulfate (SAS) (sodium salt, 99% active powder) was then added to the mixing vessel. 10 Grams of $C_{12}$–$C_{15}$ alcohol ethoxysulfate having an average of three ethylene oxide units per molecule (AES) (sodium salt, 60% active) was then added and the mixture was allowed to mix well. 6 Grams of $C_{12}$–$C_{13}$ alcohol ethoxylate having an average of 6.5 ethylene oxide units per molecule (AE) was thereafter added and the mixture was allowed to stir. The temperature was then raised to 110°–120° F. (43°–39° C.). Following the temperature increase, 2 grams of coconut fatty acid, 8 grams of citric acid and 5 grams of sodium hydroxide (50% solution) were added to the mixture. The resulting material was a clear stable liquid. The properties of the composition prepared are presented in Table I and FIG. 1.

Example 2

49 Grams of water were added to the mixing vessel and warmed to 90° F. (38° C.). 2 Grams of ethanol, 2 grams of monoethanolamine and 4 grams of propylene glycol were then added. 7.3 Grams of $C_{14}$ secondary alkyl sulfate (SAS) (sodium salt, 99% active powder) and 4.8 grams of $C_{18}$ secondary alkyl sulfate (SAS) (sodium salt, 99% active powder)were then added to the mixing vessel. 10 Grams of $C_{12}$—$C_{15}$ alcohol ethoxysulfate having an average of three ethylene oxide units per molecule (AES) (sodium salt, 60% active) was then added and the mixture was allowed to mix well. 6 Grams of $C_{12}$—$C_{13}$ alcohol ethoxylate having an average of 6.5 ethylene oxide units per molecule (AE) was thereafter added and the mixture was allowed to stir. The temperature was then raised to 110°–120° F. (43°–39° C.). Following the temperature increase, 2 grams of coconut fatty acid, 8 grams of citric acid and 5 grams of sodium hydroxide (50% solution) were added to the mixture. The resulting material was a clear stable liquid. The properties of the composition prepared are presented in Table I and FIG. 1.

Comparative Example A

Comparative Example A was carried out in a manner similar to Example 1, except that 41 grams of water were used and 20 grams of $C_{12}$ linear alkylbenzene sulfonate (LAS) (sodium salt, 99% active) were used in place of the secondary alkyl sulfate component, The properties of the composition prepared are presented in Table I and FIG. 1.

Example 3

42.4 Grams of water wore added to the mixing vessel and warmed to 90° F. (38° C.). 2 Grams of ethanol, 2 grams of monoethanolamine and 4 grams of propylene glycol were then added. 12.1 Grams of $C_{14}$ secondary alkyl sulfate (sodium salt, 99% active powder) was then added to the mixing vessel. 16.6 Grams of $C_{12}$–$C_{15}$ alcohol ethoxysulfate having an average of three ethylene oxide units per molecule (sodium salt, 60% active) was then added and the mixture was allowed to mix well. 6 Grams of $C_{12}$–$C_{13}$ alcohol ethoxylate having an average of 6.5 ethylene oxide units per molecule was thereafter added and the mixture was allowed to stir. The temperature was then raised to 110°–120° F. (43°–39° C.). Following the temperature increase, 2 grams of coconut fatty acid, 8 grams of citric acid and 5 grams of sodium hydroxide (50% solution) were added to the mixture. The resulting material was a clear stable liquid. The properties of the composition prepared are presented in Table I and FIG. 1.

Comparative Example B

Comparative Example B was carried out in a manner similar to Example 3, except that 34.4 grams of water were used and 20 grams of $C_{12}$ linear alkylbenzene sulfonate (LAS) (sodium salt, 60% active) were used in place of the secondary alkyl sulfate component. The properties of the composition are presented in Table I and FIG. 1.

Comparative Example C

Comparative Example C was carried out in a manner similar to Example 3, except that 25.5 grams of water were used and 28.9 grams of $C_{14}$–$C_{15}$ primary alkyl sulfate (PAS) (sodium salt, 17.3% active) were used in place of the secondary alkyl sulfate component, The properties of the composition prepared are presented in Table I and FIG. 1.

Example 4

42.4 Grams of water were added to the mixing vessel and warmed to 90° F. (38° C.). 2 Grams of ethanol, 2 grams of monoethanolamine and 4 grams of propylene glycol were then added. 12.1 Grams of $C_{14}$ secondary alkyl sulfate (sodium salt, 99% active powder) was then added to the mixing vessel. 6 Grams of $C_{12}$–$C_{15}$ alcohol ethoxylate having an average of nine ethylene oxide units per molecule was then added and the mixture was allowed to mix well. 16.6 Grams of $C_{12}$–$C_{13}$ alcohol ethoxysulfate having an average of three ethylene oxide units per molecule (sodium salt, 60% active) was thereafter added and the mixture was allowed to stir. The temperature was then raised to 110°–120° F. (43°–39° C.). Following the temperature increase, 2 grams of coconut fatty acid, 8 grams of citric acid and 5 grams of sodium hydroxide (50% solution) were added to the mixture. The resulting material was a clear stable liquid. The properties of the composition prepared are presented in Table I and FIG. 1.

Example 5

42.4 Grams of water were added to the mixing vessel and warmed to 90° F. (38° C.). 2 Grams of ethanol, 2 grams of monoethanolamine and 4 grams of propylene glycol were then added. 4.8 Grams of $C_{14}$ secondary alkyl sulfate (sodium salt, 99% active powder), 6.1 grams of $C_{16}$ secondary alkyl sulfate (sodium salt, 99% active powder), and 1.2 grams of $C_{18}$ secondary alkyl sulfate (sodium salt, 99% active powder) were then added to the mixing vessel. 6 Grams of $C_{12}$–$C_{15}$ alcohol ethoxylate having an average of nine ethylene oxide units per molecule was then added and the mixture was allowed to mix well. 16.6 Grams of $C_{12}$–$C_{13}$ alcohol ethoxysulfate having an average of three ethylene oxide units per molecule (sodium salt, 60% active) was thereafter added and the mixture was allowed to stir. The temperature was then raised to 110°–120 F. (43°–39° C.). Following the temperature increase, 2 grams of coconut fatty acid, 8 grams of citric acid and 5 grams of sodium hydroxide (50% solution) were added to the mixture. The resulting material was a clear stable liquid. The properties of the composition prepared are presented in Table I and FIG. 1.

Comparative Example D

Comparative Example D was carried out in a manner similar to Example 4, except that 34.4 grams of water were used and 20 grams of $C_{12}$ linear alkylbenzene sulfonate (LAS) (sodium salt, 60% active) were used in place of the secondary alkyl sulfate component. The properties of the composition prepared are presented in Table I and FIG. 1.

Discussion of the Results and Detailed Description of the Drawing

As can be seen in Table I and FIG. 1, the level of soil removal obtained with secondary alkyl sulfate-containing heavy duty laundry liquids (Examples 1–5) is much higher than that obtained with heavy duty laundry liquids containing LAS (Comparative Examples A, B and D) and with heavy duty laundry liquids containing PAS (Comparative Example C).

TABLE I

SECONDARY ALKYLSULFATES (SAS) IN HEAVY DUTY LIQUIDS (HDL's)

| Component, % wt Basis 100% active unless otherwise indicated | Ex. 1 | Ex. 2 | Comp. Ex. A | Ex. 3 | Comp. Ex. B | Comp. Ex. C | Ex. 4 | Ex. 5 | Comp. Ex. D |
|---|---|---|---|---|---|---|---|---|---|
| $C_{14}$SAS | 12 | 7.2 | — | 12 | — | — | 12 | 4.8 | — |
| $C_{16}$SAS | — | — | — | — | — | — | — | 6 | — |
| $C_{18}$SAS | — | 4.8 | — | — | — | — | — | 1.2 | — |
| $C_{12}$LAS (60%) | — | — | 20 | — | 20 | — | — | — | 20 |
| $C_{14-15}$PAS (17.3) | — | — | — | — | — | 28.9 | — | — | — |
| $C_{12-13}EO_3S$ (60%) | 10 | 10 | 10 | 16.6 | 16.6 | 16.6 | 16.6 | 16.6 | 16.6 |
| $C_{12-13}EO_{6.5}$ | 6 | 6 | 6 | 6 | 6 | 6 | — | — | — |
| $C_{12-15}EO_9$ | — | — | — | — | — | — | 6 | 6 | 6 |
| Coconut Fatty Acid | 2 | 2 | 2 | 2 | 2 | 2 | 2 | 2 | 2 |
| Citric Acid | 8 | 8 | 8 | 8 | 8 | 8 | 8 | 8 | 8 |
| Monoethanolamine | 2 | 2 | 2 | 2 | 2 | 2 | 2 | 2 | 2 |
| Propylene glycol | 4 | 4 | 4 | 4 | 4 | 4 | 4 | 4 | 4 |
| Sodium Hydroxide (50%) | 5 | 5 | 5 | 5 | 5 | 5 | 5 | 5 | 5 |
| Ethanol | 2 | 2 | 2 | 2 | 2 | 2 | 2 | 2 | 2 |
| Water | 49 | 49 | 41 | 42.4 | 34.4 | 25.5 | 42.4 | 42.4 | 34.4 |

TABLE I-continued

SECONDARY ALKYLSULFATES (SAS) IN HEAVY DUTY LIQUIDS (HDL's)

| Component, % wt Basis 100% active unless otherwise indicated | Ex. 1 | Ex. 2 | Comp. Ex. A | Ex. 3 | Comp. Ex. B | Comp. Ex. C | Ex. 4 | Ex. 5 | Comp. Ex. D |
|---|---|---|---|---|---|---|---|---|---|
| Detergency[a)] | 36.8 | 32.0 | 24.7 | 39.5 | 28.2 | 31.8 | 40.5 | 39.4 | 29.8 |

[a)]Temperature 60° F., 300 ppm water hardness. Radiolabeled sebum soil removal from permanent press (65/35) polyester/cotton was determined as described in "Detergency. Theory and Technology", G. W. Cutler and E. Kissa, eds., Surfactant Science Series, Vol. 20, p. 125 (1987) and N. Prieto, J. Am. Oil Chem. Soc. 66 10 (1989). All examples and comparative examples were tested at a dose of 2 grams/liter. Results are expressed as percent soil removal.

What is claimed is:

1. A liquid laundry detergent composition comprising from about 1 percent by weight to about 18 percent by weight, basis the total weight of the composition, of one or more secondary alkyl sulfate compounds, from about 6 percent by weight to about 38 percent by weight, basis the total weight of the composition, of one or more cosurfactant compounds, from about 0 percent by weight to about 20 percent by weight, basis the total weight of the composition, of one or more builders, and from about 35 percent by weight to about 78 percent by weight, basis the total weight of the composition, of one or more solvents.

2. The composition of claim 1 wherein said one or more secondary alkyl sulfate compounds has a formula:

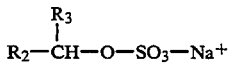

wherein $R_2$ represents an alkyl group having from about 3 to about 18 carbon atoms and $R_3$ represents an alkyl group having from about 1 to about 6 carbon atoms.

3. The composition of claim 2 wherein said one or more secondary alkyl sulfate compounds is selected from the group consisting of a $C_{12}$ secondary alkyl sulfate wherein $R_2$ represents an alkyl group having 10 carbon atoms and $R_3$ represents an alkyl group having 1 carbon atom, a $C_{14}$ secondary alkyl sulfate wherein $R_2$ represents an alkyl group having 12 carbon atoms and $R_3$ represents an alkyl group having 1 carbon atom, a $C_{16}$ secondary alkyl sulfate wherein $R_2$ represents an alkyl group having 14 carbon atoms and $R_3$ represents an alkyl group having 1 carbon atom, a $C_{18}$ secondary alkyl sulfate wherein $R_2$ represents an alkyl group having 16 carbon atoms and $R_3$ represents an alkyl group having 1 carbon atom, and mixtures of these compounds.

4. The composition of claim 1 wherein the secondary alkyl sulfate compound is added to the composition in the form of a free flowing powder.

5. The composition of claim 1 wherein the secondary alkyl sulfate compound is present in the composition in an amount of from about 6 percent by weight to about 15 percent by weight, basis the total weight of the composition.

6. The composition of claim 1 wherein said one or more builders is selected from the group consisting of alkali metal carbonates, alkali metal phosphates, alkali metal polyphosphates, alkali metal silicates, alkali metal bicarbonates, alkali metal polycarboxylates, polyacrylates and mixtures thereof.

7. The composition of claim 6 wherein said one or more builders is an alkali metal polycarboxylate.

8. The composition of claim 7 wherein said alkali metal polycarboxylate is selected from the group consisting of sodium citrate, potassium citrate, the sodium salt of tartaric acid monosuccinate, the potassium salt of tartaric acid monosuccinate, the sodium salt of tartaric acid disuccinate, the potassium salt of tartaric acid disuccinate, and mixtures thereof.

9. The composition of claim 1 wherein said builder is present in an amount of from about 4 percent by weight to about 12 percent by weight, basis the total weight of the composition.

10. The composition of claim 1 wherein said one or more cosurfactant compounds is selected from the group consisting of anionic surfactants, nonionic surfactants, cationic surfactants, zwitterionic surfactants, and mixtures thereof.

11. The composition of claim 1 wherein said one or more cosurfactant compounds is selected from the group consisting of anionic surfactants, nonionic surfactants, and mixtures thereof.

12. The composition of claim 11 wherein said one or more cosurfactant compounds is a nonionic surfactant selected from alcohol ethoxylates having an average of from about 3 to about 14 ethylene oxide units per ethoxylate molecule, alkyl-substituted phenol ethoxylates having an average of from about 3 to about 14 ethylene oxide units per ethoxylate molecule, sugar-derived glycols, and mixtures thereof.

13. The composition of claim 1 wherein said composition comprises from about 6 percent by weight to about 8 percent by weight, basis the total weight of the composition, of said one or more cosurfactant compounds.

14. The composition of claim 1 wherein said one or more solvents is selected from the group consisting of water, lower alcohols, polyols, alkali metal aryl sulfonates and mixtures thereof.

15. The composition of claim 14 wherein said one or more solvents comprises a mixture of a lower alcohol, water, and a polyol.

16. The composition of claim 1 wherein said composition comprises from about 40 percent by weight to about 60 percent by weight, basis the total weight of the composition, of one or more solvents.

17. A liquid laundry detergent composition comprising from about 6 percent by weight to about 15 percent by weight, basis the total weight of the composition, of one or more secondary alkyl sulfate compounds, from about 6 percent by weight to about 18 percent by weight, basis the total weight of the composition, of one or more cosurfactant compounds, from about 4 percent by weight to about 12 percent by weight, basis the total weight of the composition, of one or more builders, and from about 40 percent by weight to about 60 percent by weight, basis the total weight of the composition, of one or more solvents.

* * * * *